United States Patent
Rusek et al.

(10) Patent No.: US 11,581,920 B2
(45) Date of Patent: Feb. 14, 2023

(54) MULTIPLE TRANSMISSION PANELS AND NON-IDEAL BACKHAUL LINKS

(71) Applicant: Sony Corporation, Tokyo (JP)

(72) Inventors: Fredrik Rusek, Eslöv (SE); Erik Bengtsson, Eslöv (SE); Olof Zander, Södra Sandby (SE)

(73) Assignee: Sony Mobile Communications Inc., Tokyo (JP)

(*) Notice: Subject to any disclaimer, the term of this patent is extended or adjusted under 35 U.S.C. 154(b) by 5 days.

(21) Appl. No.: 17/263,357

(22) PCT Filed: Jul. 30, 2019

(86) PCT No.: PCT/EP2019/070533
§ 371 (c)(1),
(2) Date: Jan. 26, 2021

(87) PCT Pub. No.: WO2020/030476
PCT Pub. Date: Feb. 13, 2020

(65) Prior Publication Data
US 2021/0297116 A1  Sep. 23, 2021

(30) Foreign Application Priority Data
Aug. 8, 2018  (SE) .................................. 1830231-5

(51) Int. Cl.
*H04B 7/0404* (2017.01)
*H04B 7/024* (2017.01)
*H04B 7/06* (2006.01)

(52) U.S. Cl.
CPC ........... *H04B 7/0404* (2013.01); *H04B 7/024* (2013.01); *H04B 7/0634* (2013.01); *H04B 7/0689* (2013.01)

(58) Field of Classification Search
CPC .... H04B 7/0404; H04B 7/024; H04B 7/0634; H04B 7/0689
See application file for complete search history.

(56) References Cited

U.S. PATENT DOCUMENTS

| | | |
|---|---|---|
| 2012/0069793 A1 | 3/2012 | Chung |
| 2017/0055175 A1* | 2/2017 | Leroux ............ H04W 72/1268 |
| 2019/0090254 A1 | 3/2019 | Kimura et al. |

FOREIGN PATENT DOCUMENTS

| | | |
|---|---|---|
| JP | 2013080986 A | 5/2013 |
| WO | 2014167066 A1 | 10/2014 |

(Continued)

OTHER PUBLICATIONS

Huawei, HiSilicon, "Discussion on UL multi-panel/TRP operation", Sep. 18-21, 2017, 3GPP TSG RAN, R1-1715719 (Year: 2017).*
International Search Report and Written Opinion from corresponding International Application No. PCT/EP2019/070533, dated Oct. 1, 2019, 11 pages.

(Continued)

*Primary Examiner* — Sung S Ahn
(74) *Attorney, Agent, or Firm* — Tucker Ellis LLP (57) ABSTRACT

A method of configuring a multichannel uplink transmission (199) comprising multiple channels (151, 152, 159, 451, 452) between a wireless communication device (102) and multiple receive panels (1013-1, 1013-2) of at least one network node (101) is provided. The multiple receive panels (1013-1, 1013-2) and the at least one network node (101) are connected via backhaul links (1018-1, 1018-2). The method is carried out by the wireless communication device (102). The method comprises receiving, from the at least one network node (101), a downlink message encoding control data (4001) for the multichannel uplink transmission (199), the control data (4001) being associated with the backhaul links. The method further comprises configuring the multichannel uplink transmission (199) based on the control data (4001).

11 Claims, 5 Drawing Sheets

(56) References Cited

FOREIGN PATENT DOCUMENTS

| WO | 2015019728 A1 | 2/2015 |
|---|---|---|
| WO | 2016163432 A1 | 10/2016 |

OTHER PUBLICATIONS

Huawei et al., "Discussion on UL multi-panel/TRP operation", 3GPP TSG RAN WG1 Meeting 90, R1-1714345, Aug. 21-25, 2017, 5 pages.

Huawei et al., "Discussion on UL multi-panel/TRP operation", 3GPP TSG RAN WG1 Meeting NR Ad Hoc #3, R1-1715719, Sep. 18-21, 2017, 6 pages.

Huawei et al., "Motivation for NR Multi-TRP and MIMO enhancements", 3GPP TSG RAN Meeting #80, RP-180892, Jun. 11-14, 2018, 5 pages.

CATT, "Discussion on multi-panel/multi-TRP transmission"; 3GPP TSG RAN WG1 Meeting #88bis, R1-1704549, Apr. 3-7, 2017, 5 pages.

Samsung, "WI Proposal on NR MIMO Enhancements", 3GPP TSG RAN Meeting #80, RP-181453, Jun. 11-14, 2018, 5 pages.

Sony et al., "On UE UL MIMO for FR2", 3GPP TSG-RAN WG4 Meeting #86Bis, R4-1805696, Apr. 16-20, 2018, 2 pages.

Ericsson, "Multi-TRP Transmission", 3GPP TSG RAN WG1 Meeting #88, R1-1702673, Feb. 13-17, 2017, 4 pages.

Japanese Office Action dated May 10, 2022 for Application Serial No. JP2021506515 (5 pages).

Huawei,HiSilicon,"Discussion on UL multi-panel/TRP operation",3GPP TSG RAN WG1 Meeting NR AdHoc #3 R1-1715719,[online],Sep. 9, 2017,Internet<URL:https//www.3gpp.org/ftp/TSG_RAN/WG1_RL1/TSGR1_AH/NR_AH_1709/Docs/R1-1715719.zip>,[Search dateApr. 18, 2022] (8 pages).

MediaTek Inc,"Multi-TRP and Multi-panel transmission",3GPP TSG RAN WG1 Meeting #88bis R-1704447, Mar. 25, 2017,Internet<URL:https//www.3gpp.org/ftp/tsg_RAN/WG1_RL1/TSGR1_88b/Docs/R1-1704447.zip>,[Search date Apr. 18, 2022] (5 pages).

* cited by examiner

MULTIPLE TRANSMISSION PANELS AND NON-IDEAL BACKHAUL LINKS

TECHNICAL FIELD

Various examples of the invention generally relate to a multichannel uplink transmission employing multiple antenna panels. Various examples specifically relate to a scenario where the backhaul links of the multiple antenna panels face operational limitations, e.g., with respect to throughput, latency, etc.

BACKGROUND

Wireless communication is sometimes implemented using spatially-defined transmission paths of radio waves. Each transmission path corresponds to a respective channel.

Typically, implementations of a spatially-defined transmission path include using multiple antennas of an antenna panel. These techniques are generally referred to multiple antenna techniques.

Multiple antenna techniques can be implemented in various manners. In a first example, spatial multiplexing (often referred to as Multiple Input Multiple Output, MIMO) can be used to increase the overall data rate. Here, multiple spatially diverse transmission paths are set-up between transmitter and receiver. A second example includes beamforming: here, a spatial directivity for transmitting and/or receiving (communicating) is achieved by destructive and constructive interference at the multiple antennas. One or more beamformed transmission paths are set up.

Sometimes, a node can access multiple distinct antenna panels (sometimes also referred to as remote radio heads, RRH) that are spaced apart from each other and connected via a backhaul links are available, see, e.g., Third Generation Partnership Project (3GPP) TSG RAN WG1 Meeting #88: document R1-1702673 or 3GPP TSG RAN Meeting #80: document RP-181453. Such functionality is sometimes referred to as multi-transmission panel (multi-TRP). Typically, for multi-TRP, the RRHs are spaced apart at least 100 m or at least 400 m.

It has been observed that the connectivity between the multiple RRHs in a multi-TRP scenario can be affected by operational limitations imposed by the backhaul links. Such limitations in the inter-RRH connectivity can make it difficult to implement multiple antenna techniques.

SUMMARY

Therefore, a need exists for advanced multiple antenna techniques using multiple RRHs with non-ideal backhaul links.

This need is met by the features of the independent claims. The features of the dependent claims define embodiments.

A method of configuring a multichannel uplink transmission comprising multiple channels between a wireless communication device and multiple receive panels of at least one network node is provided. The multiple receive panels and the at least one network node are connected via backhaul links. The method is carried out by the wireless communication device. The method comprises receiving, from the at least one network node, a downlink message encoding control data for the multichannel uplink transmission, the control data being associated with the backhaul links. The method further comprises, based on the control data: configuring the multichannel uplink transmission.

The multiple receive panels may be accessed by the at least one network node.

The at least one network node may be an access node such as a base station of a communication network.

A computer program product or a computer program includes program code that can be executed by control circuitry. Executing the program code causes the control circuitry to perform a method of configuring a multichannel uplink transmission comprising multiple channels between a wireless communication device and multiple receive panels of at least one network node. The multiple receive panels and the at least one network node are connected via backhaul links. The method is carried out by the wireless communication device. The method comprises receiving, from the at least one network node, a downlink message encoding control data for the multichannel uplink transmission, the control data being associated with the backhaul links. The method further comprises, based on the control data: configuring the multichannel uplink transmission.

A computer-readable storage medium includes program code that can be executed by control circuitry. Executing the program code causes the control circuitry to perform a method of configuring a multichannel uplink transmission comprising multiple channels between a wireless communication device and multiple receive panels of at least one network node. The multiple receive panels and the at least one network node are connected via backhaul links. The method is carried out by the wireless communication device. The method comprises receiving, from the at least one network node, a downlink message encoding control data for the multichannel uplink transmission, the control data being associated with the backhaul links. The method further comprises, based on the control data: configuring the multichannel uplink transmission.

A wireless communication device is operative to configure a multichannel uplink transmission comprising multiple channels between the wireless communication device and multiple receive panels of at least one network node, the multiple receive panels and the at least one network node being connected via backhaul links, wherein the wireless communication device is configured to: receive, from the at least one network node, a downlink message encoding control data for the multichannel uplink transmission, the control data being associated with the backhaul links, and based on the control data, configure the multichannel uplink transmission.

A method of operating a network node having access to a plurality of receive panels is provided. The multiple receive panels and the at least one network node are connected via backhaul links. The method comprises transmitting, to a wireless communication device, a downlink message encoding control data for a multichannel uplink transmission, the control data being associated with the backhaul links. The method also may comprises participating in the multichannel uplink transmission that is configured based on the control data.

A computer program product or a computer program includes program code that can be executed by control circuitry. Executing the program code causes the control circuitry to perform a method of operating a network node having access to a plurality of receive panels. The multiple receive panels and the at least one network node are connected via backhaul links. The method comprises transmitting, to a wireless communication device, a downlink message encoding control data for a multichannel uplink transmission, the control data being associated with the backhaul links. The method also may comprises participating in the multichannel uplink transmission that is configured based on the control data.

A computer-readable storage medium includes program code that can be executed by control circuitry. Executing the program code causes the control circuitry to perform a method of operating a network node having access to a plurality of receive panels. The multiple receive panels and the at least one network node are connected via backhaul links. The method comprises transmitting, to a wireless communication device, a downlink message encoding control data for a multichannel uplink transmission, the control data being associated with the backhaul links. The method also may comprises participating in the multichannel uplink transmission that is configured based on the control data.

A network node having access to a plurality of receive panels is provided. The multiple receive panels and the at least one network node are connected via backhaul links. The network node is configured to transmit, to a wireless communication device, a downlink message encoding control data for a multichannel uplink transmission, the control data being associated with the backhaul links. The network node may be furthermore configured to participate in the multichannel uplink transmission that is configured based on the control data.

It is to be understood that the features mentioned above and those yet to be explained below may be used not only in the respective combinations indicated, but also in other combinations or in isolation without departing from the scope of the invention.

DETAILED DESCRIPTION OF EMBODIMENTS

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are taken to be illustrative only.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various examples described herein relate to wireless communication between a first node and a second node of a wireless communication system. The first node and the second node communicate on a wireless link using a multiple antenna technique, e.g., MIMO and/or beamforming.

In various examples described herein, multi-TRP is employed: here, the first node may have access to multiple RRHs. The multiple RRHs are connected with each other and/or the respective node via backhaul links. As a general rule, the backhaul links can also rely on the wireless transmission. Also, wired transmission would be possible.

According to various examples, at least one of the backhaul links faces data throughput limitations. This can be due to the distance between the multiple RRHs, a system load on the backhaul links, and/or core-network signaling limitations. Generally speaking, the at least one of the backhaul links can have a non-ideal system behavior. Limitations of the inter-RRH connectivity can result.

Hereinafter, techniques will be described in connection with mobile wireless communication between a wireless communication device—such as a terminal (user equipment; UE)— and a communication network. The communication network typically includes a radio access network (RAN) having one more base stations (BSs); and a core network (CN). The one or more BSs can be equipped with multiple RRHs according to multi-TRP. This set up of mobile wireless communication between the UE and the one or more BSs is an example; in other examples, it would also be possible that the wireless link employing multiple antenna techniques is implemented between two stationary nodes that each comprise multiple RRHs according to multi-TRP.

Hereinafter, techniques will be described in connection with uplink (UL) transmission from the UE to the RAN. Specifically, techniques will be described that allow configuring a multichannel UL transmission, wherein the multichannel UL transmission includes multiple channels that are associated with the multiple RRHs. As a general rule, one or more channels may be associated with each RRH. Different RRHs may be associated with different channels.

A channel as used herein may relate to the connectivity between two end nodes over-the-air, e.g., the connectivity between the UE and at least one RRH. The channel may be characterized by an over-the-air transmission path. The various transmission paths can be configured by antenna weights of antennas of an antenna panel. The antenna weights may define an amplitude and phase relationship between signals transmitted by the various antennas. The channel may be characterized by a certain modulation scheme and/or a certain coding scheme. The channel may be characterized by a certain repletion-based coverage enhancement (CE) policy that, e.g., may define a repetition level. The channel may be characterized by one or more parameters of a packetized data exchanged via the channel, e.g., data unit sizes, etc.

By using multiple channels associated with the multiple RRHs, spatial multiplexing can be achieved. This can increase the overall data throughput between the UE and the RAN.

According to various examples, the configuration of the multiple channels of the multichannel UL transmission takes into account control data provided by the network.

For example, the network may provide a downlink (DL) message encoding the control data. For example, a Layer 3 Radio Resource Control (RRC) DL control message may be employed. For example, the DL control message may be communicated on a physical DL control channel (PDCCH). Then, the UE can configure the multichannel UL transmission based on the control data.

The control data is associated with the backhaul links. By providing the control data and configuring the multichannel UL transmission accordingly, it becomes possible to take into account certain criteria at the UE in view of the backhaul links that would otherwise be inaccessible/transparent to the UE. For example, certain restrictions of the backhaul links can be taken into account. This helps to optimize the overall end-to-end throughput between the UE and the communication network.

For example, the control data can be determined in accordance with the one or more properties of the backhaul links. Alternatively or additionally, the control data can be indicative of the one or properties of the backhaul links.

There are generally various options available to configure the multichannel UL transmission. Some example options are described below. In one example, it would be possible to configure the channels of the multichannel UL transmission, e.g., by setting the modulation scheme and/or the coding scheme and/or by selecting between beamforming and MIMO techniques and/or by setting a repetition level. Alternatively or additionally, it would also be possible to configure the multichannel UL transmission by configuring inflow traffic shaping upstream of the multiple channels. For example, a rate allocation rule may be used to distribute incoming data between the multiple channels, one or more bonding properties may be set appropriately, etc.

Figure 1:
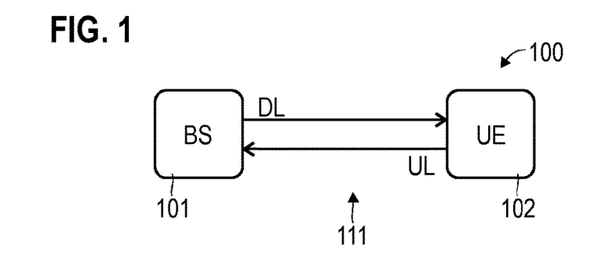
FIG. 1 schematically illustrates a wireless communication system according to various examples.

FIG. 1 schematically illustrates a communication system 100 that may benefit from the techniques disclosed herein. The communication system 100 may be implemented in accordance with a 3GPP-standardized network such as 3G, 4G, or upcoming 5G NR. Other examples include point-to-point networks such as Institute of Electrical and Electronics Engineers (IEEE)-specified networks, e.g., the 802.11x Wi-Fi protocol or the Bluetooth protocol. Further examples include 3GPP NB-10T or eMTC networks.

The communication system 100 includes a BS 101 and a UE 102. The BS 101 is part of a RAN (not illustrated in FIG. 1). The RAN may include multiple BSs.

A wireless link 111 is established between the BS 101—e.g., a gNB in the 3GPP NR framework—and the UE 102. The wireless link 111 includes a DL wireless link from the BS 101 to the UE 102; and further includes an UL wireless link from the UE 102 to the BS 101.

As a general rule, various multi-antenna techniques may be implemented for communication on the wireless link 111; e.g., including MIMO and/or beamforming.

The UE 102 may be one of the following: a smartphone; a cellular phone; a tablet; a notebook; a computer; a smart TV; an MTC wireless communication device; an eMTC wireless communication device; an IoT wireless communication device; an NB-IoT wireless communication device; a sensor; an actuator; etc.

Figure 2:
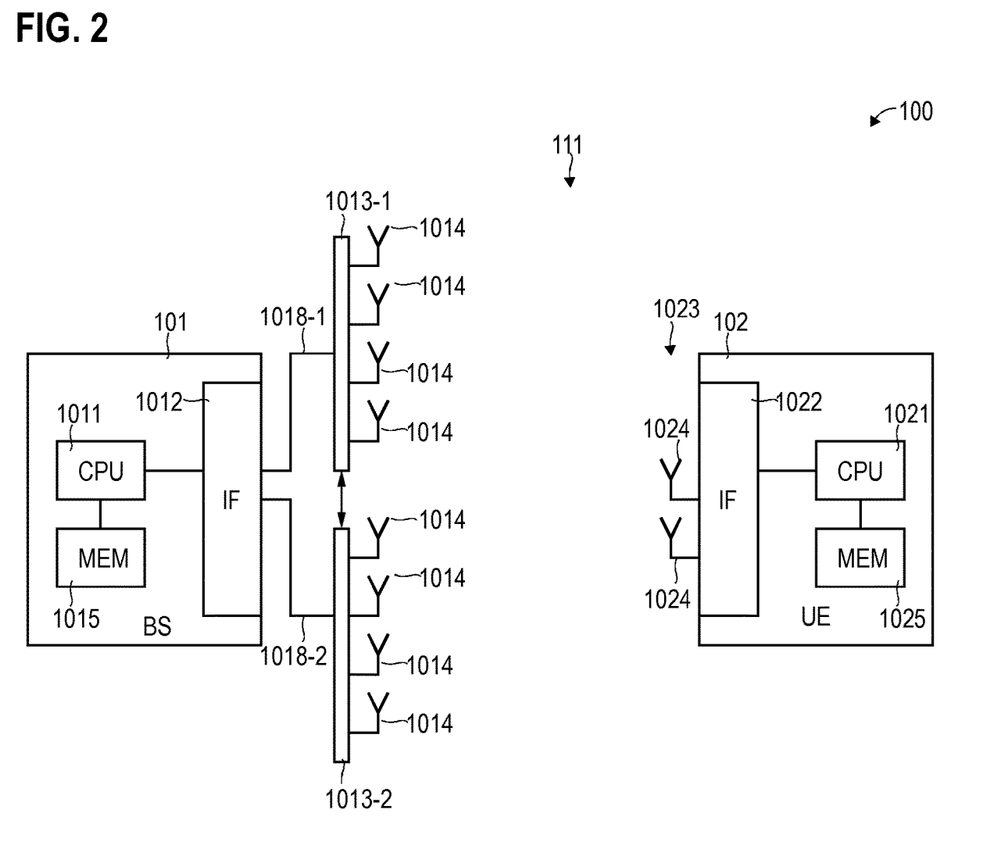
FIG. 2 schematically illustrates the wireless communication system of FIG. 1 in greater detail, wherein a base station of the wireless communication system includes multiple RRHs.

FIG. 2 schematically illustrates the communication system 100, the BS 101, and the UE 102 in greater detail.

The BS 101 includes a processor 1011, a memory 1015, and an interface 1012.

The interface 1012 is configured to transmit and/or receive (communicate) via the wireless link 111. For this, the interface 1012 is connected via backhaul links 1018-1, 1018-2 with two RRHs 1013-1, 1013-2. Each RRH 1013-1, 1013-2 includes multiple antennas 1014. As illustrated in FIG. 2, the RRHs 1013-1, 1013-2 are separated from each other by a certain distance, typically at least a few meters or even a few 100 meters. Each antenna 1014 may include one or more electrical traces to carry a radio frequency current. Each antenna 1014 may include one or more LC-oscillators implemented by the electrical traces. Each trace may radiate electromagnetic waves with a certain beam pattern. In some examples the BS 101 may include multiple antenna panels (not illustrated in FIG. 2).

Typically, each RRH 1013-1, 1013-2 may include a count of at least 40 antennas, or at least 400 antennas.

The BS 101 may include more than two RRHs 1013-1, 1013-2.

The processor 1011 and the memory 1015 form a control circuit. The memory 1015 may store program code that can be executed by the processor 1011. Executing the program code may cause the processor 1011 to perform techniques with respect to providing control data for a multichannel transmission from the BS 101 to the UE 102 or from the UE 102 to the BS 101; participate in a multichannel UL transmission; participate in a MIMO transmission; participate in a beamformed transmission; etc.

The UE 102 includes a processor 1021, a memory 1025, and an interface 1022. The interface 1022 is coupled via antenna ports (not shown in FIG. 2) with an antenna panel 1023 including a plurality of antennas 1024. In some examples, the antenna panel 1023 may include at least 6 antennas, optionally at least 16 antennas, further optionally at least 32 antennas. Generally, the antenna panel 1023 of the UE 102 may include fewer antennas 1024 than the RRHs 1013-1, 1013-2 of the BS 101. Each antenna 1024 may include one or more electrical traces to carry a radio frequency current. Each antenna 1024 may include one or more LC-oscillators implemented by the electrical traces. Each trace may radiate electromagnetic waves with a certain beam pattern. Also the UE 102 may include multiple antenna panels 1023 (not illustrated in FIG. 2).

The processor 1021 and the memory 1025 form a control circuit. The memory 1025 may store program code that can be executed by the processor 1021. Executing the program code may cause the processor 1021 to perform techniques with respect to receiving control data for an UL multichannel transmission; configuring the multichannel UL transmission based on the control data; participate in the multichannel UL transmission; participate in a MIMO transmission; participate in a beamformed transmission; etc.

Figure 3:
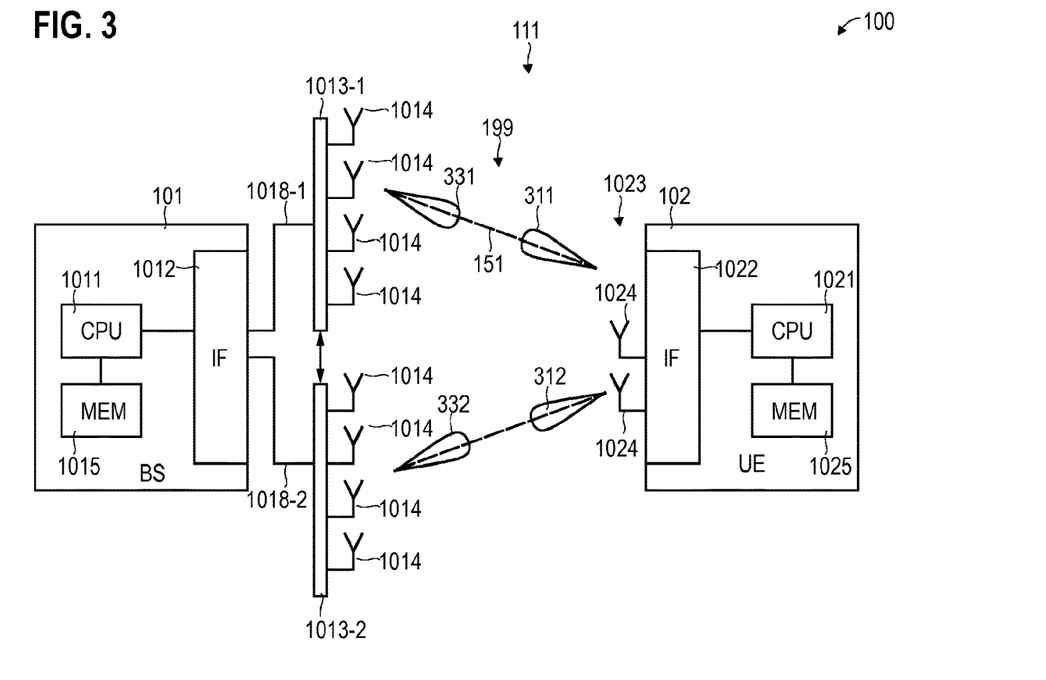
FIG. 3 schematically illustrates a beamforming scenario for the wireless communication system of FIGS. 1 and 2.

FIG. 3 schematically illustrates the communication system 100, the BS 101, and the UE 102 in greater detail. The scenario of FIG. 3 corresponds to the scenario of FIG. 2. FIG. 3 illustrates aspects in connection with the multichannel UL transmission 199.

Specifically, FIG. 3 illustrates a first implementation of the multichannel UL transmission 199. FIG. 3 illustrates aspects with respect to beamforming.

In the example of FIG. 3, the multichannel UL transmission 199 includes two channels 151, 152. The two channels 151, 152, in the example of FIG. 3, are implemented using beamforming. In detail, spatial multiplexing across the multiple channels 151, 152 is achieved by using two beamformed transmission paths, each beamformed transmission path being associated with a respective RRH 1013-1, 1013-2. For example, line-of-sight (LOS) or non-LOS transmission paths may be used. Non-LOS transmission paths include one or more reflections.

The channel 151 is from the UE 102 to the RRH 1013-1 and a second channel 152 is from the UE 102 to the RRH 1013-2. The channel 151 is associated with a transmit beam 311 implemented by appropriate antenna weights for the antennas 1024 of the antenna panel 1023 at the UE 102. The channel 151 is also associated with a receive beam 331 implemented by appropriate antenna weights for the antennas 1014 of the RRH 1013-1. Likewise, the channel 152 is associated with a transmit beam 312 and a receive beam 332. The beams 311, 312, 331, 332 define the spatial orientation of the respective transmission paths.

The receive beam 331 is implemented by phase-coherent reception of the antennas 1014 of the RRH 1013-1. The receive beam 332 is implemented by phase-coherent reception of the antennas 1014 of the RRH 1013-2. For implementing the receive beam 331, it is not required to take into account signals received at the antennas 1014 of the RRH 1013-2; likewise, for implementing the receive beam 332, it is not required to take into account the amplitude and phase of the signals received at the antennas 1014 of the RRH 1013-1. This is because the beamformed transmission paths of the channels 151, 152 non-coherently target the RRH 1013-1 and the RRH 1013-2, respectively. In other words, there is no strict phase relationship required between signals communicated along the channel 151 and signals communicated along the channel 152. Thus, typically time and/or frequency synchronization is not required between the operation of the multiple RRHs 1013-1, 1013-2. Signals received at the RRH 1013-1 can be decoded independent of signals received at the RRH 1013-2. A somewhat different scenario is illustrated in connection with FIG. 4.

Figure 4:
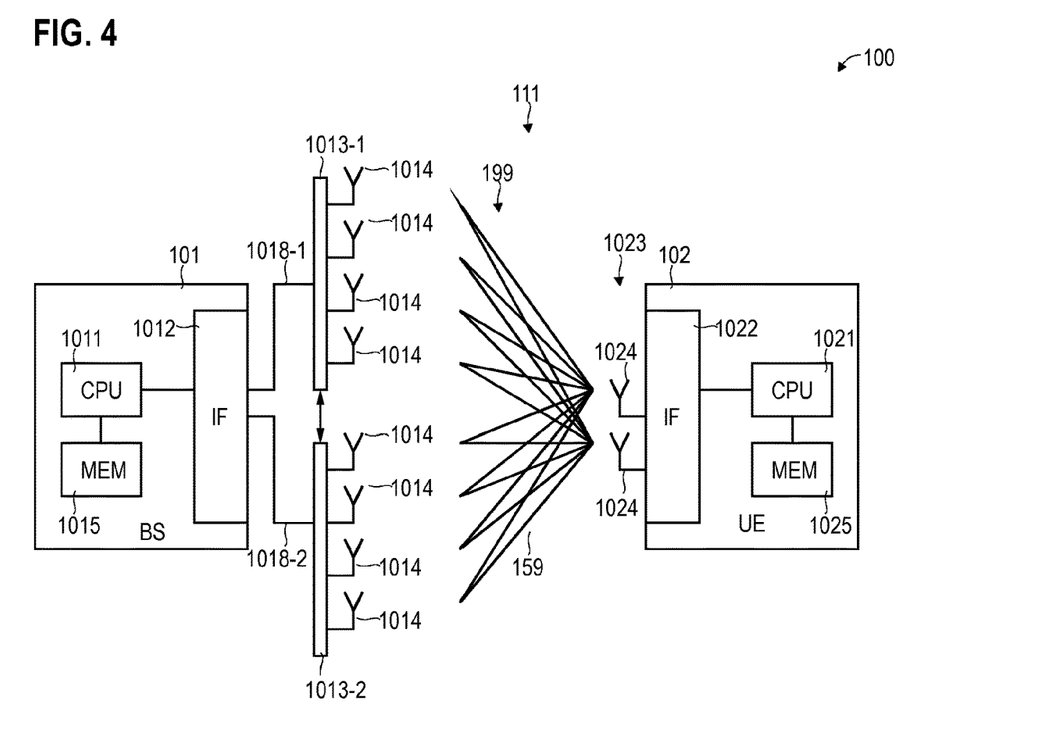
FIG. 4 schematically illustrates a MIMO scenario for the wireless communication system of FIGS. 1 and 2.

FIG. 4 schematically illustrates the communication system 100, the BS 101, and the UE 102 in greater detail. The scenario of FIG. 4 corresponds to the scenario of FIG. 2. FIG. 4 illustrates aspects in connection with the multichannel UL transmission. Specifically, FIG. 4 illustrates a second implementation of the multichannel UL transmission. FIG. 4 illustrates aspects with respect to MIMO.

In the scenario of FIG. 4, the multichannel UL transmission is implemented using MIMO across the two RRHs 1013-1, 1013-2. There are many channels 159, specifically there are channels between each one of the antennas 1024 of the antenna panel 1023 and each one of the antennas 1014 of both RRHs 1013-1, 1013-2. Again, each channel 159 is associated with a respective spatial transmission path.

The channels 159 can be set to be independent of each other with reduced coupling, based on a singular value decomposition of the channel matrix. Decorrelation of the signals received along the various channels at the receiver is possible, sometimes referred to as zero-forcing. Closed-loop MIMO techniques with feedback on the precoding matrix can be used (precoding matrix indication, PMI).

There is a phase relationship between the signals communicated along the channels 159. Hence, the multiple RRHs 1013-1, 1013-2 are coherently targeted by the channels 159.

This requires coherent decoding of the signals received at the antennas 1014 of all RRHs 1013-1, 1013-2. In other words, it may be required to provide information on the amplitude and phase of signals received at the antennas 1014 of the RRH 1013-1 via the backhaul link 1018-1 and/or to provide information on the amplitude and phase of signals received at the antennas 1014 of the RRH 1013-2 via the backhaul link 1018-2. Also, a timing and/or frequency synchronization may be required between the operation of the RRHs 1013-1, 1013-2.

Because such an exchange of information on amplitude and/or phase, as well as synchronization is typically not required for the scenario of FIG. 3, there is a tendency that the overall traffic load imposed on the backhaul links 1018-1, 1018-2 is larger for the scenario of FIG. 4 than for the scenario of FIG. 3. For non-ideal backhaul links 1018-1, 1018-2, this may result in latency. This, in turn, may limit the end-to-end UL data throughput from the UE 102 to the BS 101. On the other hand, the spatial multiplexing tends to be smaller for the beamforming scenario of FIG. 3 than for the MIMO scenario of FIG. 4. This again favors the MIMO scenario of FIG. 4 in terms of the end-to-end UL data throughput.

Various techniques are based on the finding that the end-to-end UL data through can be optimized if the properties of the backhaul links 1018-1, 1018-2 are taken into account when configuring the multichannel UL transmission 199. Specifically, various techniques are based on the finding that by tailoring the multichannel UL transmission 199 in view of limitations imposed by non-ideal backhaul links 1018-1, 1018-2, the end-to-end UL data throughput can be increased. Details of such techniques are described hereinafter.

Figure 5:
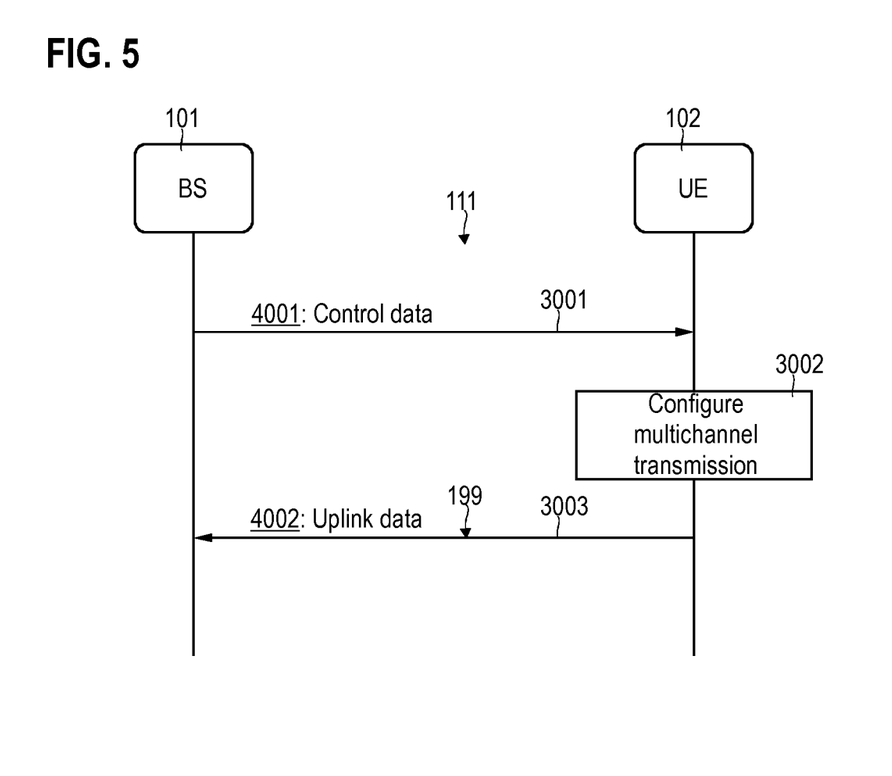
FIG. 5 is a signaling diagram according to various examples.

FIG. 5 is a signaling diagram of communication on the wireless link 111 between the BS 101 and the UE 102.

At 3001, control data 4001 is transmitted by the BS 101 and received by the UE 102. The control data 4001 can be encoded, e.g., using Layer 3 RRC encoding. For example, the control data 4001 can be included in a Layer 3 DL control message. It would be possible that the control data 4001 is included in a broadcasted message; e.g., a system information block (SIB). The control data 4001 can be distributed on a per-cell level, i.e., to all UEs connected to or camping on a cell in a cellular communication network.

The information content of the control data 4001 can vary from implementation to implementation. Depending on the information content of the control data 4001, the logic implemented at the UE 102 may vary.

For example, scenarios are conceivable in which the BS 101 dictates—to a larger or smaller degree—the UE behavior with respect to the configuration of the multichannel UL transmission 199. Below, a few examples are given for the implementation of the control data 4001 in scenarios in which the BS 101 can control the UE behavior to a larger degree.

For example, in a first scenario, the control data may be indicative of the antenna weights for the antenna panel 1023 that implement the spatial transmission paths of the channels 151, 152, 159. A codebook approach may be used. The UE 102 can determine the antenna weights by reading the respective information element of the control data 4001.

In a second scenario, the control data could be indicative of a configuration of the multiple channels 151, 152, 159 selected from a plurality of candidate configurations. This can correspond to a codebook-based approach. For example, the candidate configurations may pertain to the MIMO scenario of FIG. 4 vs. the beamforming scenario of FIG. 3. For example, the candidate configurations may specify a modulation scheme and/or a coding scheme and/or a repetition level of a CE policy. The, UE can configure the multichannel UL transmission 199 by reading the respective information element of the control data 4001.

In a third scenario, the control data could be indicative of one or more rate allocation rules for inflow traffic shaping to be applied by the UE in connection with the multichannel UL transmission 199. For example, it would be possible that certain channels 151, 152, 159 are required to obey a lower threshold of the associated data rate than others, etc.

In a fourth example, the BS 101 may inform the UE 102 to transmit in a way that maximizes the throughput on the wireless link 111, e.g., without considering the backhaul links 1018-1, 1018-2. Such a scenario may be applicable where the backhaul links 1018-1, 1018-2 provide a sufficiently large capacity.

Above, scenarios have been described in which the decision logic for selecting the appropriate transmission strategy for the multichannel UL transmission 199 fully or at least partly resides at the BS 101. The BS 101 hence dictates the behavior of the UE 102.

However, other scenarios are conceivable in which the decision logic for selecting the appropriate strategy for the multichannel UL transmission 199 is at least partly shifted from the BS 101 to the UE 102.

For example, the control data could be indicative of service qualities of one or more of the backhaul links 1018-1, 1018-2. Then, the UE 102 can conclude on the appropriate transmission strategy for the multichannel UL transmission 199 based on the service qualities of the one or more backhaul links 1018-1, 1018-2.

As a general rule, the service quality may include at least one of latency, error rate, priority, and throughput rate. For example, the service qualities of each one of the multiple backhaul links 1018-1, 1018-2 may be indicated; in an alternative scenario it would be possible to indicate the service quality of the particular backhaul link 1018-1, 1018-2 that faces the strongest restriction, e.g., the backhaul link having the highest latency, the highest error rate, and/or the lowest throughput rate. Such a scenario would facilitate a worst-case approach and limit control signaling overhead. Different ones of the backhaul links 1018-1, 1018-2 may be prioritized with respect to each other.

For example, the service quality of one or more of the backhaul links 1018-1, 1018-2 may be indicated by means of a quantitative number, e.g., 2 bits per second per Hz. The service quality could also be indicated by means of a quality index according to a codebook. For example, a 3 bit indicator could be used to discriminate between 8 service quality levels. The service quality level can be generally indicated explicitly or implicitly. An example for an implicit indication of the service quality level can include signaling a common identity for the multiple RRHs 1013-1, 1013-2 to indicate that the backhaul links 1018-1, 1018-2 have the capacity for supporting coherent decoding across multiple MIMO transmission paths according to the example of FIG. 4; differently, with different identities are signaled for the multiple RRHs 1013-1, 1013-2 this may indicate that the backhaul links 1018-1, 1018-2 do not have the capacity for supporting coherent decoding across multiple MIMO transmission paths according to the example of FIG. 4.

Next, at block 3002, the UE 102 configures multichannel UL transmission 199. As a general rule, there are various options available for configuring the multichannel UL transmission 199 at 3002. Generally speaking, it would be possible to configure the multiple channels 151, 152, 159; and/or configure the inflow traffic shaping upstream of the over-the-air transmission along the wireless link 111.

Some examples of how the multichannel UL transmission 199 can be configured are proved below.

(i) For example, the multichannel UL transmission 199 may be configured according to the scenario of FIG. 3, i.e., using beamformed transmission paths non-coherently targeting each one of the RRHs 1013-1, 1013-2 of the BS 101; or may be configured according to the scenario of FIG. 4, i.e., using spatially-diverse MIMO transmission paths that coherently target the RRHs 1013-1, 1013-2. The UE 102 may implement a respective selection between these scenarios at 3002, based on the control data 4001.

As mentioned above, by selecting between MIMO and beamforming, the load imposed on the backhaul links 1018-1, 1018-2 can be tailored; thereby, in turn, it is possible to tailor the end-to-end UL data throughput, as explained above.

(ii) As a further example, the configuration of the multiple channels 151, 152, 159 at 3002 may include determining appropriate antenna weights for the antenna panel 1023 at the UE 102. There are generally various options available for determining the antenna weights. For example, for the beamforming scenario of FIG. 3, it would be possible that the antenna weights for the transmit beams 311, 312 are determined using a codebook-based approach. Here, it would be possible to implement a beam sweep, e.g., a DL beam sweep (under the assumption of reciprocity) and/or an UL beam sweep. One or more pilot signals can be communicated on the beams of the beam sweep; then, the appropriate beam can be selected based on a receive property of the one or more pilot signals. In particular, the appropriate beam can be selected from a codebook, i.e., from a pre-defined set of candidate beams. Different beam sweeps may be implemented for the different RRHs 1013-1, 1013-2. In an alternative implementation, it would be possible that the antenna weights for the transmit beams 311, 312 are calculated based on a receive property (e.g., amplitude and/or phase) of one or more DL pilot signals and/or one or more UL pilot signals. This can be based on a sounding of the various channels of the wireless link 111, e.g., in combination with a singular value decomposition of the associated channel matrix. Then, for the beamforming scenario of FIG. 3, the dominant singular value associated with the transmission between the RRH 1013-1 and the antenna panel 1023 can be selected for the transmission path implementing the channel 151; and the dominant singular value associated with the transmission between the RRH 1013-2 and the antenna panel 1023 can be selected for the transmission path implementing the channel 152. For the MIMO scenario of FIG. 4, it would be possible to use the full rank of the channel matrix can be used to transmit data across the various spatially-diverse channels 159. Here, it is possible to enable zero-forcing, i.e., decorrelation of the signals along the transmission paths of the various channels 159 at the receiver with interference nulling. Thus, the crosstalk between the signals transmitted along the various transmission paths may be limited. Respective techniques are known, e.g., from David Tse and Pramod Viswanath, "Fundamentals of Wireless Communication", Cambridge University Press, 2005, section 8.3.1, "Linear decorrelator". This facilitates flexible and individual selection of the modulation and coding schemes for the various channels and/or of the transmit powers.

As mentioned above, by determining the appropriate antenna weights, it is possible to selectively address one or more of the RRHs 1013-1, 1013-2. Thereby, the load imposed on the backhaul links 1018-1, 1018-2 can be tailored; thereby, in turn, it is possible to tailor the end-to-end UL data throughput, as explained above.

(iii) As a further example, the configuration of the multiple channels 151, 152, 159 at 3002 may include determining the modulation scheme and/or and the coding scheme and/or a repetition count of a repetition-based CE for the various channels 151, 152, 159.

By determining the coding scheme, the modulation scheme, and/or the repetition level for the various channels 151, 152, 159, the data throughput per channel and per time can be tailored. Thereby, the load imposed on the backhaul links 1018-1, 1018-2 can be tailored; thereby, in turn, it is possible to tailor the end-to-end UL data throughput, as explained above.

(iv) As a further example, as already mentioned above, the configuration of the multiple channels of the multichannel UL transmission 199 at 3003 may include inflow traffic shaping for the multiple channels 151, 152, 159. Inflow traffic shaping may pertain to appropriately controlling the inflow of data to each one of the channels 151, 152, 159. This can include Layer 2, Medium Access Control (MAC) layer processing; for example, data packets may be distributed between the various channels. For this, rate allocation rules of the inflow traffic shaping may be taken into account. Bonding of the multiple channels 151, 152, 159 can be implemented. Bonding can relate to techniques of splitting and/or fusing together data streams of UL data across the multiple channels 151, 152, 159.

The multichannel UL transmission 199 is then implemented at 3003, in accordance with the configuration of 3002 that is based on the control data 4001. UL data 4002 is transmitted by the UE 102 and received by the BS 101 when participating in the multichannel UL transmission 199.

Figure 6:
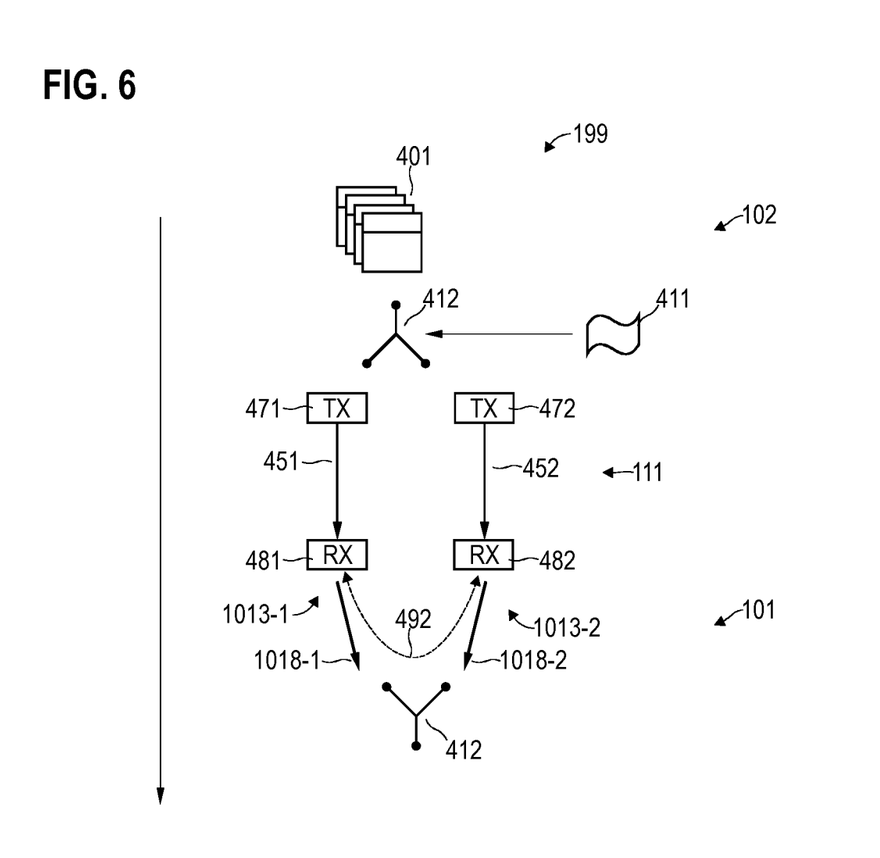
FIG. 6 schematically illustrates configuring a multichannel UL transmission according to various examples.

FIG. 6 illustrates aspects with respect to the multichannel UL transmission 199 of UL data 401 from the UE 102 to the BS 101. The signaling flow is from top to bottom in FIG. 6.

Initially, the UL data 401 arrives at a transmit buffer at the UE 102, e.g., on MAC layer. The UL data 401 can arrive in packetized form, e.g., on the MAC layer in the form of MAC Service Data Units (SDUs).

Then, inflow traffic shaping is implemented to configure the channels 451, 452. The inflow traffic shaping may be generally implemented according to the beamforming scenario of FIG. 3 or the MIMO scenario of FIG. 4. The inflow traffic shaping affects the data throughput across each one of the channels 451, 452.

In the illustrated example, the inflow traffic shaping includes bonding 412; the bonding 412, as part of inflow traffic shaping, controls the distribution of the UL data 401 across the channels 451, 452 of the multichannel UL transmission 199. For example, if the UL data 401 arrives at a MAC layer transmit buffer, then the bonding 412 may be implemented for MAC service data units, etc. The bonding 412 may take into account rate allocation rules 411. The rate allocation rules 411 may specify the distribution of the UL data 401 between the various channels 451, 452.

Generally, the inflow traffic shaping is not limited to the bonding 412. For example, the inflow traffic shaping may also take into account a queue length of transmit buffers associated with each channel 451, 452, e.g. Layer 1, PHY transmission buffers, etc. Alternatively or additionally, the inflow traffic shaping may take into account a quality of service level associated with the individual packets of UL data 401, e.g., if compared to certain latency restrictions imposed by the channels 451, 452.

As a general rule, properties of the inflow traffic shaping may be set depending on the control data 4001 when configuring the multiple channels 451, 452. For example, the control data 4001 could be indicative of the rate allocation rule 411; or the rate allocation rule 411 may be determined based on the control data 4001.

Next, the UL data 401 allocated, by the bonding 412, to the channel 451 is transmitted along the respective spatial transmission path. At block 472, the UL data 401 allocated to the channel 452 is transmitted along the respective spatial transmission path. This includes PHY Layer 1 processing. A coherent control of the various antennas 1024 of the antenna panel 1023 is used to implement these spatial transmission paths.

At 481, 482, signals are received along the channels 451, 452. This includes PHY Layer 1 processing. The reception at 481 and 482 can be independent of each other in a beamforming scenario (cf. FIG. 3). In a MIMO scenario, the reception at 481 and 482 is coupled and respective control signaling 492 may have to be exchanged between the RRHs 1013-1, 1013-2 along the backhaul links 1018-1, 1018-2. This can introduce additional latency.

Upon completion of the reception of the data 401, the data 401 is passed along the backhaul links 1018-1, 1018-2. Again, due to limitations in the capacity of the backhaul links 1018-1, 1018-2, this can introduce latency.

Finally, bonding 412 is again implemented to bring together the individual streams of data associated with the channels 451, 452.

According to some examples, the end-to-end throughput between the input-side of the bonding 412 at the UE 102 and the output-side of the bonding 412 at the BS 101 can be optimized (cf. vertical arrow in FIG. 6). To do so, the bonding 412 at the UE 102 may take into consideration the quality of the channels 451, 452 as well as the backhaul links 1018-1, 1018-2.

Figure 7:
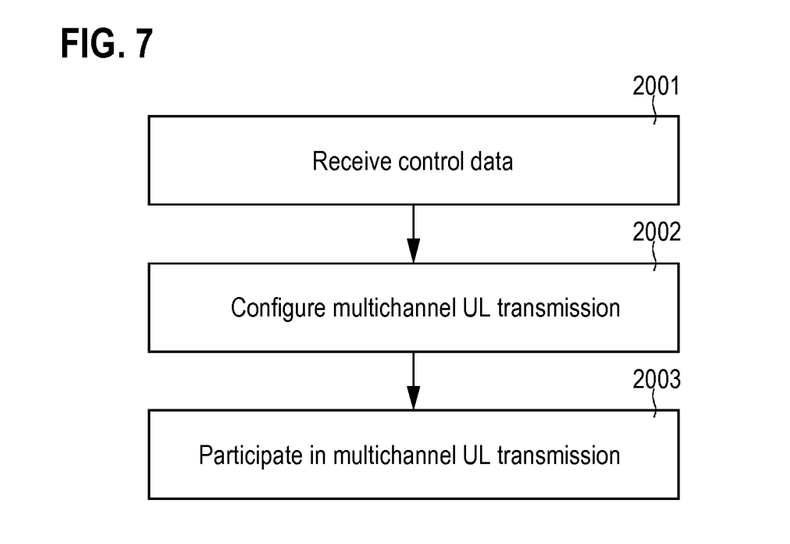
FIG. 7 is a flowchart of a method according to various examples.

FIG. 7 is a flowchart of a method according to various examples. The method of FIG. 7 is implemented by a UE. The UE may be connectable or may be connected to a cellular network. For example, the method of FIG. 7 may be implemented by the control circuitry 1021, 1025 of the UE 102 (cf. FIG. 2). FIG. 7 illustrates aspects with respect to a multichannel UL transmission from a UE to one or more BSs of the network. The one or more BSs have access to multiple RRHs via backhaul links. Thereby, a multi-antenna technique is implemented.

Initially, at block 2001, control data is received from a network. The control data can be received encoded in a downlink message, e.g., a Layer 3 control message or a broadcasted system information block (cf. FIG. 5, control data 4001).

The control data is associated with backhaul links of multiple RRHS of one or more BSs of the network. For example, the control data may be determined based on one or more properties of the backhaul links; and/or may be indicative of one or more properties of the backhaul links.

Next, at block 2002, a multichannel UL transmission from the UE to the network is configured, based on the control data. For example, it would be possible to configure one or more of the channels of the multichannel UL transmission based on the control data. Alternatively or additionally, it would also be possible to configure inflow traffic shaping of the multiple channels of the multichannel UL transmission.

Various options are available for configuring the one or more channels of the multichannel UL transmission: for example, antenna weights defining spatial transmission paths associated with the multiple channels could be determined. Alternatively or additionally, it would be possible to set a repetition count of the CE policy for each one of the channels. Alternatively or additionally, a modulation scheme and/or a coding scheme could be set for each one of the channels. It would be possible to select between MIMO and beamforming. It would be possible to phase-coherently target multiple RRHs; or individually target one or more of the multiple RRHs, such that no phase-coherent decoding is required across multiple RRHs.

Various options are available for configuring the inflow traffic shaping of the multichannel UL transmission: for example, a maximum queue length of transmission buffers associated with the multiple channels could be set. Rate allocation could be set, e.g., by setting a corresponding rate allocation rule. For example, quality of service rules associated with the multiple channels could be set.

It would be generally possible to implement an optimization of one or more of such parameters of the one or more channels and/or of the inflow traffic shaping when executing block 2002. Specifically, the optimization may have a target function that is defined with respect to an end to end data throughput between the UE and the cellular network.

At block 2003, the UE participates in the multichannel UL transmission, e.g., by receiving from higher layers packetized UL data, distributing the packetized UL data across the multiple channels, and transmitting the packetized UL data along the multiple channels.

Figure 8:
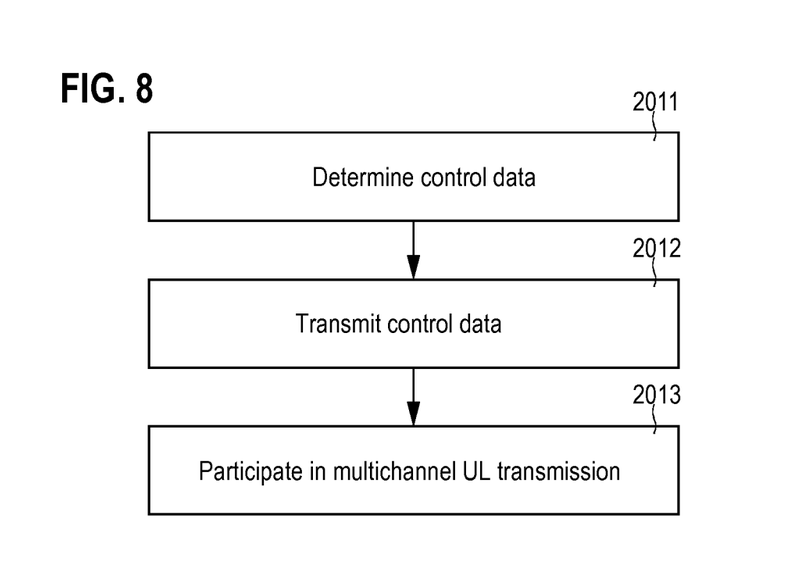
FIG. 8 is a flowchart of method according to various examples.

FIG. 8 is a flowchart of a method according to various examples. For example, the method of FIG. 8 may be executed by a BS, or generally a network node. For example, the method of FIG. 8 may be executed by the control circuitry 1011, 1015 of the BS 101 (cf. FIG. 2). FIG. 8 illustrates aspects with respect to a multichannel UL transmission from a UE to one or more BSs. The one or more BSs have access to multiple RRHs via backhaul links. Thereby, a multi-antenna technique is implemented.

Initially, at block 2011, control data is determined. The control data may be determined based on one or more properties of the backhaul links. Depending on the scenario, block 2011 may involve more or less logic at the BS.

For example, in some scenarios, the control data is indicative of antenna weights to be used by the UE; then, channel sounding of a wireless link between the UE and the network may be taken into account to appropriately steer multiple channels of the multichannel UL transmission using the antenna weights, e.g., towards one or more of the RRHs. In other examples, a simple report on a service quality of the backhaul links. For this, block 2011 may including sounding the backhaul links.

In, at block 2012, the control data determined at block 2011 is transmitted to the UE. As such, block 2012 is interrelated to block 2001 of FIG. 7.

Next, at block 2013, the BS participates in the multichannel UL transmission. As such, block 2013 is interrelated to block 2003 of FIG. 7.

The UE has configured the multichannel UL transmission based on the control data of block 2012. Depending on the configuration of the multichannel UL transmission reception of signals communicated along multiple channels of the multichannel UL transmission may or may not include phase-coherent decoding across multiple RRHs.

Block 2013 includes signaling of UL data along the backhaul links. As the UL data transmission has been configured in accordance with the control data, certain limitations imposed by the backhaul links can be effectively mitigated. For example, the UL data can be actively steered to a first one of the RRHs that as a capable backhaul link and can be actively steered away from a second one of the RRHs that has a less capable backhaul link.

Summarizing, multiple antenna techniques have been described in which the BS includes two or more RRHs. In some examples, a DL communication between BS and UE is implemented the BS can inform the UE about the quality of at least one of the backhaul links; the BS then leaves it up to the UE to select a suitable transmission strategy. Alternatively, the BS may dictate the transmission strategy and operations to be carried out at the UE, depending on the exchange capability of the backhaul links.

These techniques help to overcome limitations of conventional techniques in which properties of the backhaul links are unknown to the UE. In such conventional techniques, the UE typically takes a conservative position and assume the worst possible case, thereby exacting a considerable loss to overall UL data throughput.

Summarizing, the following examples have been described:

Example 1. A method of configuring a multichannel uplink transmission (199) comprising multiple channels (151, 152, 159, 451, 452) between a wireless communication device (102) and multiple receive panels (1013-1, 1013-2) of at least one network node (101), the multiple receive panels (1013-1, 1013-2) and the at least one network node (101) being connected via backhaul links (1018-1, 1018-2), the method being carried out by the wireless communication device (102), wherein the method comprises: receiving, from the at least one network node (101), a downlink message encoding control data (4001) for the multichannel uplink transmission (199), the control data (4001) being associated with the backhaul links, and based on the control data (4001): configuring the multichannel uplink transmission (199).

Example 2. The method of example 1, wherein said configuring comprises selecting between (i) beamformed transmission paths that non-coherently target each one of the multiple receive panels (1013-1, 1013-2); and (ii) spatially-diverse transmission paths that coherently target the multiple receive panels (1013-1, 1013-2).

Example 3. The method of example 1 or 2, wherein the wireless communication device (102) comprises antennas, wherein said configuring comprises determining antenna weights for the antennas. For example, the control data may be indicative of the antenna weights. The multiple channels may implement spatially diverse transmission paths that coherently target the multiple receive panels. For example, the antenna weights may be determined to enable decorrelation with nulls interference of signals of the multichannel uplink transmission transmitted along different ones of the spatially diverse transmission paths.

Example 4. The method of any one of the preceding examples, wherein said configuring comprises performing an optimization of an end-to-end throughput between the wireless communication device (102) and the at least one network node (101).

Example 5. The method of any one of the preceding examples, wherein said configuring comprises inflow traffic shaping for the multiple channels (151, 152, 159, 451, 452) of the multichannel uplink transmission (199).

Example 6. The method of example 5, wherein the inflow traffic shaping comprises bonding (412) of the multiple channels (151, 152, 159, 451, 452) of the multichannel uplink transmission (199).

Example 7. The method of example 5 or 6, wherein the control data (4001) is indicative of a rate allocation of the inflow traffic shaping for the multiple channels (151, 152, 159, 451, 452) of the multichannel uplink transmission (199).

Example 8. The method of any one of the preceding examples, wherein said configuring comprises setting at least one of a modulation scheme, and a coding scheme of the multichannel uplink transmission. Alternatively or additionally, the configuring may comprise setting a repetition count of a repetition-based coverage enhancement of the multichannel uplink transmission (199).

Example 9. The method of any one of the preceding examples, wherein the control data (4001) is indicative of a service quality of at least one of the backhaul links (1018-1, 1018-2). For example, the service quality may comprise at least one of latency, error rate, priority, and throughput rate associated with at least one of the backhaul links.

In the various examples described above, the control data could be generally indicative of a configuration of the multiple channels selected from a plurality of candidate configurations.

In the various examples described above, at least one of the backhaul links may have a limited data throughput due to at least one of: a distance between the multiple receive panels; a throughput of a transmission medium between the multiple receive panels; a system load of the backhaul links; and a core network signaling limitation.

Example 10. A method of operating a network node having access to a plurality of receive panels (1013-1, 1013-2), the multiple receive panels (1013-1, 1013-2) and the at least one network node (101) being connected via backhaul links (1018-1, 1018-2), wherein the method comprises: transmitting, to a wireless communication device (102), a downlink message encoding control data (4001) for a multichannel uplink transmission (199), the control data (4001) being associated with the backhaul links, and participating in the multichannel uplink transmission (199) that is configured based on the control data (4001).

Example 11. A wireless communication device operative to configure a multichannel uplink transmission (199) comprising multiple channels (151, 152, 159, 451, 452) between the wireless communication device (102) and multiple receive panels (1013-1, 1013-2) of at least one network node (101), the multiple receive panels (1013-1, 1013-2) and the at least one network node (101) being connected via backhaul links (1018-1, 1018-2), wherein the wireless communication device is configured to: receive, from the at least one network node (101), a downlink message encoding control data (4001) for the multichannel uplink transmission (199), the control data (4001) being associated with the backhaul links, and based on the control data (4001), configure the multichannel uplink transmission (199).

The wireless communication device can be configured to perform the method of any one of examples 1 to 9.

Example 12. A network node having access to a plurality of receive panels, the multiple receive panels (1013-1, 1013-2) and the at least one network node (101) being connected via backhaul links (1018-1, 1018-2), wherein the network node is configured to: transmit, to a wireless communication device (102), a downlink message encoding control data (4001) for a multichannel uplink transmission (199), the control data (4001) being associated with the backhaul links, and optionally participate in the multichannel uplink transmission (199) that is configured based on the control data (4001).

Although the invention has been shown and described with respect to certain preferred embodiments, equivalents and modifications will occur to others skilled in the art upon the reading and understanding of the specification. The present invention includes all such equivalents and modifications and is limited only by the scope of the appended claims.

For illustration, above, various techniques have been described in which multiple antenna panels are connected to a given BS via backhaul links. In some scenarios, multiple antenna panels may also be connected via backhaul links to more than a single BS. Then, there may be additional connectivity between the BSs by core network signaling.

For further illustration, above, various scenarios have been described with respect to a UE communicating with one or more BSs. Similar scenarios may also be applied to communication between any wireless communication device and other kinds and types of network nodes—e.g., Wireless Local Area Network, WLAN, access nodes.

For further illustration, above, various scenarios have been described with respect to uplink transmission from a UE to a network. Similar scenarios may also be implemented for communication between two stationary nodes.

The invention claimed is:

1. A method of configuring a multichannel uplink transmission comprising multiple channels between a wireless communication device and multiple receive panels of at least one network node, the multiple receive panels and the at least one network node being connected via backhaul links, the method being carried out by the wireless communication device,
wherein the method comprises:
receiving, from the at least one network node, a downlink message encoding control data for the multichannel uplink transmission, the control data being associated with the backhaul links; and
based on the control data, inflow traffic shaping the multichannel uplink transmission to control inflow of data to each of the multiple channels by distributing the data across the multiple channels based on latency restrictions in the multiple channels and/or a latency in fusing the data at the at least one network node using the backhaul links connecting the multiple receive panels.

2. The method of claim 1, wherein said configuring comprises:
selecting between:
beamformed transmission paths that non-coherently target each one of the multiple receive panels; and
spatially-diverse transmission paths that coherently target the multiple receive panels.

3. The method of claim 1, wherein:
the wireless communication device comprises antennas; and
said configuring comprises determining antenna weights for the antennas.

4. The method of claim 1, wherein said configuring comprises performing an optimization of an end-to-end throughput between the wireless communication device and the at least one network node.

5. The method of claim 1, wherein the inflow traffic shaping comprises bonding of the multiple channels of the multichannel uplink transmission.

6. The method of claim 1, wherein the control data is indicative of a rate allocation of the inflow traffic shaping for the multiple channels of the multichannel uplink transmission.

7. The method of claim 1,
wherein said configuring comprises setting at least one of a modulation scheme, a coding scheme, and/or a repetition count of a repetition-based coverage enhancement of the multichannel uplink transmission.

8. The method of claim 1,
wherein the receiving the control data comprises receiving control data indicative of a service quality of at least one of the backhaul links.

9. A method of operating a network node having access to a plurality of receive panels, the multiple receive panels and the at least one network node being connected via backhaul links, the method comprising:
transmitting, to a wireless communication device, a downlink message encoding control data for a multichannel uplink transmission, the control data being associated with the backhaul links; and participating in the multichannel uplink transmission that is inflow traffic shaped based on the control data providing control inflow of data to each of the multiple channels by distributing the data across the multiple channels based on latency restrictions in the multiple channels and/or a latency in fusing the data at the at least one network node using the backhaul links connecting the multiple receive panels.

10. A wireless communication device operative to configure a multichannel uplink transmission comprising multiple channels between the wireless communication device and multiple receive panels of at least one network node, the multiple receive panels and the at least one network node being connected via backhaul links, wherein the wireless communication device is configured to:

receive, from the at least one network node, a downlink message encoding control data for the multichannel uplink transmission, the control data being associated with the backhaul links; and based on the control data, inflow traffic shaping the multichannel uplink transmission to control inflow of data to each of the multiple channels by distributing the data across the multiple channels based on latency restrictions in the multiple channels and/or a latency in fusing the data at the at least one network node using the backhaul links connecting the multiple receive panels.

11. A network node having access to a plurality of receive panels, the multiple receive panels and the at least one network node being connected via backhaul links, wherein the network node is configured to:

transmit, to a wireless communication device, a downlink message encoding control data for a multichannel uplink transmission, the control data being associated with the backhaul links; and optionally participate in the multichannel uplink transmission that is inflow traffic shaped based on the control data to control inflow of data to each of the multiple channels by distributing the data across the multiple channels based on latency restrictions in the multiple channels and/or a latency in fusing the data at the at least one network node using the backhaul links connecting the multiple receive panels.

* * * * *